Figure 1:
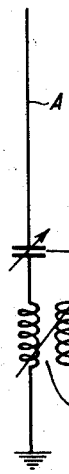
Figure 1:
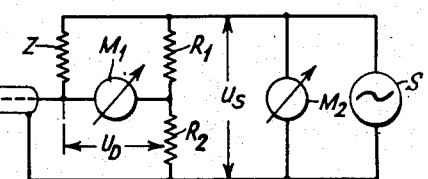

June 29, 1943.    H. E. PAUL    2,323,076
MEASURING ARRANGEMENT ADAPTED TO CHECK OR MEASURE MISMATCHING
Filed May 13, 1941

INVENTOR
H. ERICH PAUL
BY H.S.Grover
ATTORNEY

Patented June 29, 1943

2,323,076

UNITED STATES PATENT OFFICE 2,323,076

MEASURING ARRANGEMENT ADAPTED TO CHECK OR MEASURE MISMATCHING

H. Erich Paul, Berlin, Germany; vested in the Alien Property Custodian

Application May 13, 1941, Serial No. 393,224
In Germany February 9, 1940

8 Claims. (Cl. 171—95)

It is a well known fact that the antenna and the transmission line feeding the antenna should be adapted to and match each other as closely as feasible. In fact, the transferred resistance of the antenna should be as equal as possible to the characteristic or surge impedance of the feeder line, for where this situation prevails no standing waves will arise on the line. For checkup whether there is exact matching (or to measure the amount of lack of matching or mismatching), it has heretofore been necessary to make potential measurements along the feeder cable over a length of distance equalling at least a half wavelength at the operating frequency. It is only where the potential distribution is constant that standing waves are avoided so that accurate matching is insured, while voltage differences along the conductor mean more or less mismatching.

The arrangement known in the prior art involves a tedious and complicated measuring method and elaborate means, particularly where routine checkup and supervision is desired so that mismatched conditions suddenly arising during service due to switching operations, damage or detuning of the antenna and which are liable to endanger the operation and existence of the line are immediately indicated.

Now, according to the present invention, for the purpose of checkup and measurement of mismatching a bridge scheme is created, one arm of which contains the input of the transmission line and which is of such dimensions that a balanced state prevails in the bridge only when there is matched condition. In this arrangement a measuring instrument must be connected to one diagonal and an alternating potential be applied across the other diagonal of the bridge, said potential having the frequency of the operating frequency.

Precise measurement of the mismatched conditions, according to another object and development of the basic idea of the invention is feasible by constructing the bridge scheme in such a way that one arm includes the input of the transmission line, the adjoining arm an impedance equal to the surge or characteristic impedance of the transmission line, while in the remaining two arms are connected two impedances which are equal to each other. Where dimensions as stated are used, the relationship of the two diagonal potentials is a direct criterion and measure for the mismatching. If the measuring potential impressed across the bridge is not known or is not absolutely constant, also this potential is conveniently measured by the aid of a further measuring instrument. What would then be most advantageous is the use of a measuring instrument or a measuring device calibrated so as to give readings in direct terms of the quotient of the two potentials, say, a crossed-coil or a crossed-needle type of instrument.

Figure 2:
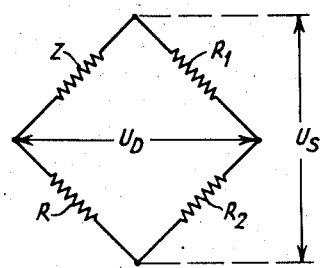
Figure 3:
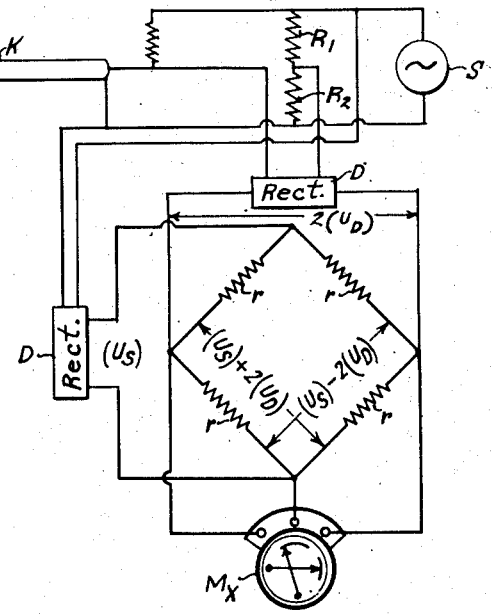

An exemplified embodiment of the invention is shown in Figure 1, while Figure 2 illustrates the equivalent bridge circuit and Figure 3 is a modification of a portion of Figure 1. The antenna A of Figure 1 is united with the end of the concentric or coaxial cable line K through a radio frequency transformer T having a variable ratio of transformation. For the compensation of such reactances as may arise, additional variable impedances C may be included in the antenna or at the cable end of the transformer.

At the end of the cable line away from the antenna which is normally supplied, for instance, with the potential of a short-wave transmitter, is connected a bridge arrangement. The same consists of the input resistance of the cable (with associated antenna) and three impedances $R_1$, $R_2$, $Z$. The latter impedance is made equal to or bears a fixed relation to the characteristic impedance of the cable K and is united with the inner conductor of the cable. The two adjoining impedances $R_1$ and $R_2$, basically speaking, may be of any desired nature at all, for example, they could also consist of capacities, though they should bear the same relation to one another as do the impedance of the cable K and the impedance Z.

Between the outer conductor and the junction point between Z and $R_1$ is applied the radio frequency potential of the measuring transmitter S. In the following description this will be denoted by $U_s$ and which is measured by the measuring instrument $M_2$. The frequency of this measuring transmitter is equal to the working frequency of the arrangement, in other words, in the present instance equal to the frequency of the short-wave transmitter being joined by the cable with the antenna. The potential $U_D$ which arises across the other diagonal, that is to say, between the input of the inner conductor and the junction point of $R_1$ and $R_2$ is measured by the measuring instrument $M_1$ of a type having a high internal resistance.

The equivalent scheme of the bridge arrangement is shown in Figure 2. In this diagram R represents the input resistance (which is mostly of a complex nature) of the cable with the antenna associated by way of the transformer. In the presence of matched condition $R=Z$. Since, moreover, $R_1$ is always equal to $R_2$, bridge balance exists and there is $U_D=0$.

As will be found by simple calculation there is generally $$U_D = \frac{1}{2} U_S \left(\frac{R-Z}{R+Z}\right)$$

Since, as known from practice, the reflectivity or reflection factor $v$ (being the fraction of the reflected power) is representable by the expression $$v = \left(\frac{R-Z}{R+Z}\right)$$

there results.

$$v = \frac{2|U_D|}{|U_S|}$$

The double ratio of the two potentials read in the instruments $M_1$ and $M_2$, that is to say, of their reflected values, represents directly the reflection factor.

If the potential $U_S$ may be assumed to be as constant and known, then measuring instrument $M_2$ may be dispensed with while measuring instrument $M_1$ may be calibrated to read directly in terms of reflection factor $v$. However, it is also possible instead to use calibration in terms of "mismatch" which may be defined as the ratio of maximum potential to minimum potential inside the standing wave and which is connected with the reflection factor by this equation $$k = \frac{1+v}{1-v}$$

therefore $$k = \frac{|U_S| + 2|U_D|}{|U_S| - 2|U_D|}$$

If potential $U_S$ may not be taken to be stable and constant (more particularly so in the presence of load fluctuations), it will be desirable to measure potential $U_D$ and $U_S$ by a crossed-coil type of instrument or a crossed-pointer measuring instrument calibrated to read directly in terms of the quotient of both potentials. In lieu of $M_1$ and $M_2$ there are then provided the two coils of the cross-coil instrument or the two instrument units of the cross-pointer instrument. Also, in this case calibration in terms of $v$ or $k$ is possible.

On the basis of the potentials $U_S$ and $U_D$ as measured, it is also possible to calculate the power intake of the aerial and the cable by this formula:

$$N = \frac{(U_S + 2U_D)(U_S - 2U_D)}{4Z} = \frac{U_S^2 - 4U_D^2}{4Z}$$

The measuring device may be so arranged that the mismatch $k$ and the power $N$ may be read directly by the aid of a single cross-needle instrument. To do this and in order to also provide a more convenient calibration a structure according to Figure 3 may be used. Herein a second bridge composed of four resistances $r$ is connected to the bridge circuit of Figure 1 through rectifiers D in such a manner that the rectified potentials proportional to $|U_S|$ and to $|U_D|$ are applied to the diagonals of the resistance bridge. Then, from two adjacent resistances, potentials may be obtained which are directly proportional to potentials $$|U_S| + 2|U_D| \text{ and } |U_S| - 2|U_D|$$

Inasmuch as the quotient of these two potentials directly gives the mismatch and its amount, whereas the product is proportional to the power, the dial of the crossed-pointer instrument $M$ may be calibrated in such a way that one tracing or curve corresponds to mismatch and the other to power.

If in addition the alternating potential arising across the resistance Z be measured on the basis of the three measured potentials the resistance R of the cable with aerial, that is, the active and the reactive components thereof may be calculated.

Instead of the measuring transmitter S the same transmitter as intended for sending out signals may be used, provided that the power dissipation in impedance Z is considered tolerable, which may be assured by properly proportioning Z and the impedance of the feeder. $R_1$ and $R_2$ may be reactances and in the above case should be proportioned as the ratio of impedance Z to the impedance of the feeder. If the bridge is to be used for permanent checkup, then the power may be registered continuously.

It will be understood that in lieu of an aerial any other convenient consumer device or load may be connected with the output end of the transmission line. The invention, moreover, is usable also where a recurrent structure or network is employed in lieu of the transmission line. Also, a transformer could be substituted. The bridge scheme of the invention in this instance serves also for a checkup or for measuring the existing mismatching when a load is connected. The impedance Z is then to be chosen equal to the input resistance of the unloaded transformer.

I claim:

1. Measuring arrangement adapted to checkup or measure the mismatching of a transmission line and a load, especially an antenna, characterized by a bridge arrangement one arm of which includes the input of the transmission line and which is of such dimensions that a bridge balance prevails only in the presence of proper matching, one diagonal of the said bridge containing a potential measuring instrument, while across the other diagonal of the bridge is impressed an alternating potential of operating frequency.

2. Measuring arrangement adapted to checkup or measure the mismatching of a transmission line and a load, especially an antenna, characterized by a bridge arrangement one arm of which includes the input of the transmission line and which is of such dimensions that a bridge balance prevails only in the presence of proper matching, one diagonal of the said bridge containing a potential measuring instrument, while across the other diagonal of the bridge is impressed the operating frequency.

3. Measuring arrangement as claimed in claim 1, with the characteristic feature that the bridge scheme is so designed that one arm includes the input of the transmission line and the adjoining arm contains an impedance which is equal to the surge impedance of the line, while the two remaining adjacent arms contain two like impedances.

4. A measuring arrangement as claimed in claim 1 with the characteristic feature that the bridge arrangement is so designed that one arm includes the input of the transmission line and the adjoining arm contains an impedance equal to the surge impedance of the line while the two remaining adjacent arms contain two like impedances and a potential measuring instrument is connected across the input of said transmission line.

5. Measuring arrangement adapted to check-up or measure the mismatching of a transmission line and a load, especially an antenna, characterized by a bridge arrangement one arm of which includes the input of the transmission line and which is of such dimensions that a bridge balance prevails only in the presence of proper matching, one diagonal of the said bridge containing a potential measuring instrument, while across the other diagonal of the bridge is impressed an alternating potential of operating frequency and means for measuring said potential.

6. Measuring arrangement adapted to check-up or measure the mismatching of a transmission line and a load, especially an antenna, characterized by a bridge arrangement one arm of which includes the input of the transmission line and which is of such dimensions that a bridge balance prevails only in the presence of proper matching, one diagonal of the said bridge containing a potential measuring instrument, while across the other diagonal of the bridge is impressed an alternating potential of operating frequency, means for measuring said potential, said means and said instrument being so arranged as to give a single reading representative of the quotient of said potentials across said diagonals.

7. An arrangement for measuring the mismatching of a transmission line and a load including an impedance bridge circuit, one arm of which includes the input of said transmission line, a source of alternating current of operating frequency of said load connected across one diagonal of said bridge, said arms being so dimensioned that said bridge is balanced when said transmission line is matched to said load, means for measuring the potential across each diagonal of said bridge, said last mentioned means being adapted to indicate as a single quantity the quotient of said potentials.

8. An arrangement for measuring the mismatching of a transmission line and a load including an impedance bridge circuit, one arm of which includes the input of said transmission line, a source of alternating current of operating frequency of said load connected across one diagonal of said bridge, said arms being so dimensioned that said bridge is balanced when said transmission line is matched to said load, an ohmic bridge circuit having its diagonals connected through rectifying means across the diagonals of said impedance bridge, a crossed needle potential measuring instrument having a pair of actuating means, one of said means being connected across each of a pair of adjacent arms of said ohmic bridge whereby the quotient and the product of the potentials across the diagonals of said impedance bridge may be determined.

H. ERICH PAUL.